United States Patent

Shemla et al.

[11] Patent Number: 5,809,557
[45] Date of Patent: Sep. 15, 1998

[54] MEMORY ARRAY COMPRISED OF MULTIPLE FIFO DEVICES

[75] Inventors: David Shemla, Kfar Havradim; Avigdor Willenz, Kamoon; Gerardo Waisbaum, Karmiel, all of Israel

[73] Assignee: Galileo Technologies Ltd., Karmiel, Israel

[21] Appl. No.: 790,153

[22] Filed: Jan. 28, 1997

[30] Foreign Application Priority Data

Jan. 31, 1996 [IL] Israel ............................. 116984

[51] Int. Cl.$^6$ ............................................... G06F 12/06
[52] U.S. Cl. ........................... 711/173; 711/211; 711/220; 711/170; 395/872; 365/193; 365/221
[58] Field of Search ............................ 711/173, 170, 711/159, 153, 149, 147, 211, 220; 375/372; 395/872; 365/221, 193

[56] References Cited

U.S. PATENT DOCUMENTS

| | | | |
|---|---|---|---|
| 5,228,002 | 7/1993 | Huang | 365/221 |
| 5,255,239 | 10/1993 | Taborn et al. | 365/221 |
| 5,349,683 | 9/1994 | Wu et al. | 371/49.2 |
| 5,572,148 | 11/1996 | Lytle et al. | 326/41 |
| 5,612,926 | 3/1997 | Yazawa et al. | 365/239 |

*Primary Examiner*—Tod R. Swann
*Assistant Examiner*—J. Peikari
*Attorney, Agent, or Firm*—Darby & Darby

[57] ABSTRACT

A multiple FIFO array which does not use numerous single FIFO devices is provided. The multiple FIFO array includes a memory partitioned into a plurality of N sections, each section corresponding to one of N FIFOs. The memory has a write address input, write strobe input, data input, read address input, read strobe and data output. Also included is a plurality of N write pointer registers, a write multiplexer having N write inputs, a write output and a write select input, a plurality of N read registers and a read multiplexer. Each write pointer register corresponds to one of N FIFOs and each write pointer register holds the write address corresponding to one of N FIFOs. The N write inputs of the write multiplexer are coupled to the output of the plurality of N write pointer registers, the write output is coupled to the write address input in the memory and the write select input couples one of the N write inputs to the write output. Each read pointer register corresponds to one of the N FIFOs, each read pointer register holding the read address corresponding to one of the N FIFOs. The read multiplexer has N read inputs, a read output and a read select input, the N read inputs being coupled to the output of the plurality of N read pointer registers, the read output coupled to the read address input in the memory, and the read select input coupling one of the N read inputs to the read output.

13 Claims, 2 Drawing Sheets

MEMORY ARRAY COMPRISED OF MULTIPLE FIFO DEVICES

FIELD OF THE INVENTION

The present invention relates to first in first out (FIFO) arrays and in particular to memory based multiple FIFO arrays.

BACKGROUND OF THE INVENTION

FIFO arrays or memory devices allow communications between two systems to occur when both systems cannot communicate at the same speed. FIFO memories find application in many different situations where one system or device needs to communicate with another system or device but both devices or systems cannot communicate synchronously with each other. FIFO arrays also maintain the byte or word order in which data is stored into them. In addition, FIFOs currently available generally implement a single FIFO per device. To implement multiple FIFO arrays, many individual FIFO devices are needed, thus increasing the cost and chip count of these multiple FIFO arrays.

SUMMARY OF THE INVENTION

Accordingly, it is an object of the present invention to provide a multiple FIFO array that does not use numerous single FIFO first-in-first-out devices.

It is also an object of the present invention to provide a multiple FIFO array that is based on conventional memory.

Yet another object of the present invention is to provide a modular multiple FIFO array that can be easily scaled to construct an array having any number of N FIFOs.

There is thus provided, in accordance with a preferred embodiment of the present invention, a multiple FIFO array which includes a memory partitioned into a plurality of N sections, each section corresponding to one of N FIFOs, the memory having a write address input, write strobe input, data input, read address input, read strobe and data output. Also included is a plurality of N write pointer registers, each write pointer register corresponding to one of N FIFOs, each write pointer register holding the write address corresponding to one of N FIFOs. Included also is a write multiplexer having N write inputs, a write output and a write select input, the N write inputs coupled to the output of the plurality of N write pointer registers, the write output coupled to the write address input in the memory, the write select input for coupling one of the N write inputs to the write output. In addition, a plurality of N read registers is included, each read pointer register corresponding to one of the N FIFOs, each read pointer register holding the read address corresponding to one of the N FIFOs. Also included is a read multiplexer having N read inputs, a read output and a read select input, the N read inputs coupled to the output of the plurality of N read pointer registers, the read output coupled to the read address input in the memory, the read select input for coupling one of the N read inputs to the read output.

In accordance with a preferred embodiment of the present invention, the array further includes a plurality of N registers holding data corresponding to the N FIFOs, the data being written into the memory via the data input upon activation of the write strobe. In addition, the number N is a positive integer. The memory is 64 words deep and each of said words is 32 bits wide.

Also in accordance with a preferred embodiment of the present invention, there is provided a multiple FIFO array including a memory partitioned into a plurality of N sections, each section corresponding to one of N FIFOs, the memory having a write address input, write strobe input, data input, read address input, read strobe and data output, a plurality of N write pointer registers, each write pointer register corresponding to one of the N FIFOs, each write pointer register holding the lower portion of the write address corresponding to one of the N FIFOs, a write multiplexer having N write inputs, a write output and a write select input, the N write inputs coupled to the output of the plurality of N write pointer registers, the write output coupled to the write address input in the memory, the write select input for coupling one of the N write inputs to the write output, a plurality of N read registers, each read pointer register corresponding to one of the N FIFOs, each read pointer register holding the lower portion of the read address corresponding to one of the N FIFOs, a read multiplexer having N read inputs, a read output and a read select input, the N read inputs coupled to the output of the plurality of N read pointer registers, the read output coupled to the read address input in the memory, the read select input for coupling one of the N read inputs to the read output, the read select input provided by a read select signal, the read select signal forming the upper portion of the read address input, and arbitration circuitry coupled to the write select input and the write address input, the arbitration circuitry for receiving a write request signal and a write select signal, the write select signal for forming the upper portion of the write address input and the write select input.

BRIEF DESCRIPTION OF THE DRAWINGS

The invention is herein described, by way of example only, with reference to the accompanying drawings, wherein.

DETAILED DESCRIPTION OF THE INVENTION

Figure 1:
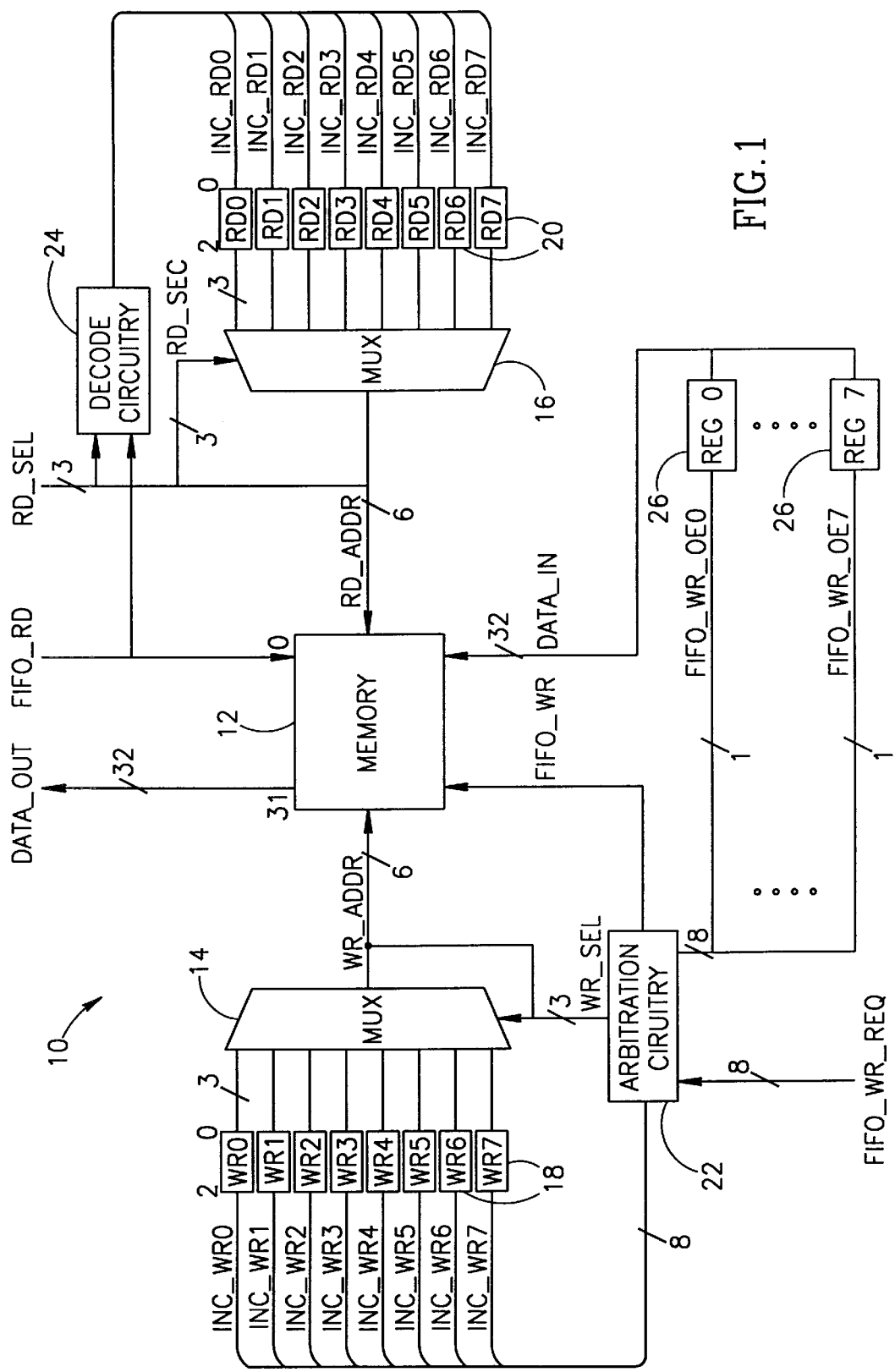
FIG. 1 is a detailed schematic diagram illustrating a memory based multiple FIFO array built in accordance with a preferred embodiment of the present invention.

A detailed schematic diagram of an example system built in accordance with a preferred embodiment of the present invention is illustrated in FIG. 1. The memory based multiple FIFO array disclosed in FIG. 1 can be useful as a solution for applications requiring multiple FIFOs that have constraints of cost and space. The present invention, generally referred to as 10, implements a multiple FIFO array using ordinary memory such as random access memory (RAM). In addition, the memory can be any type such as dynamic or static. In general, a memory array 12 (i.e. RAM) is partitioned into multiple sections. Each memory section acts as the memory for one FIFO. The example illustrated in FIG. 1 implements an array of eight FIFOs using RAM memory. It will be obvious to those skilled in the art that a FIFO array having any integer number of N FIFOs can be constructed using the principles disclosed in the present invention. Thus, the eight FIFO array illustrated in FIG. 1 can be scaled either up or down by adding or deleting components, as is obvious to those skilled in the art.

Figure 2:
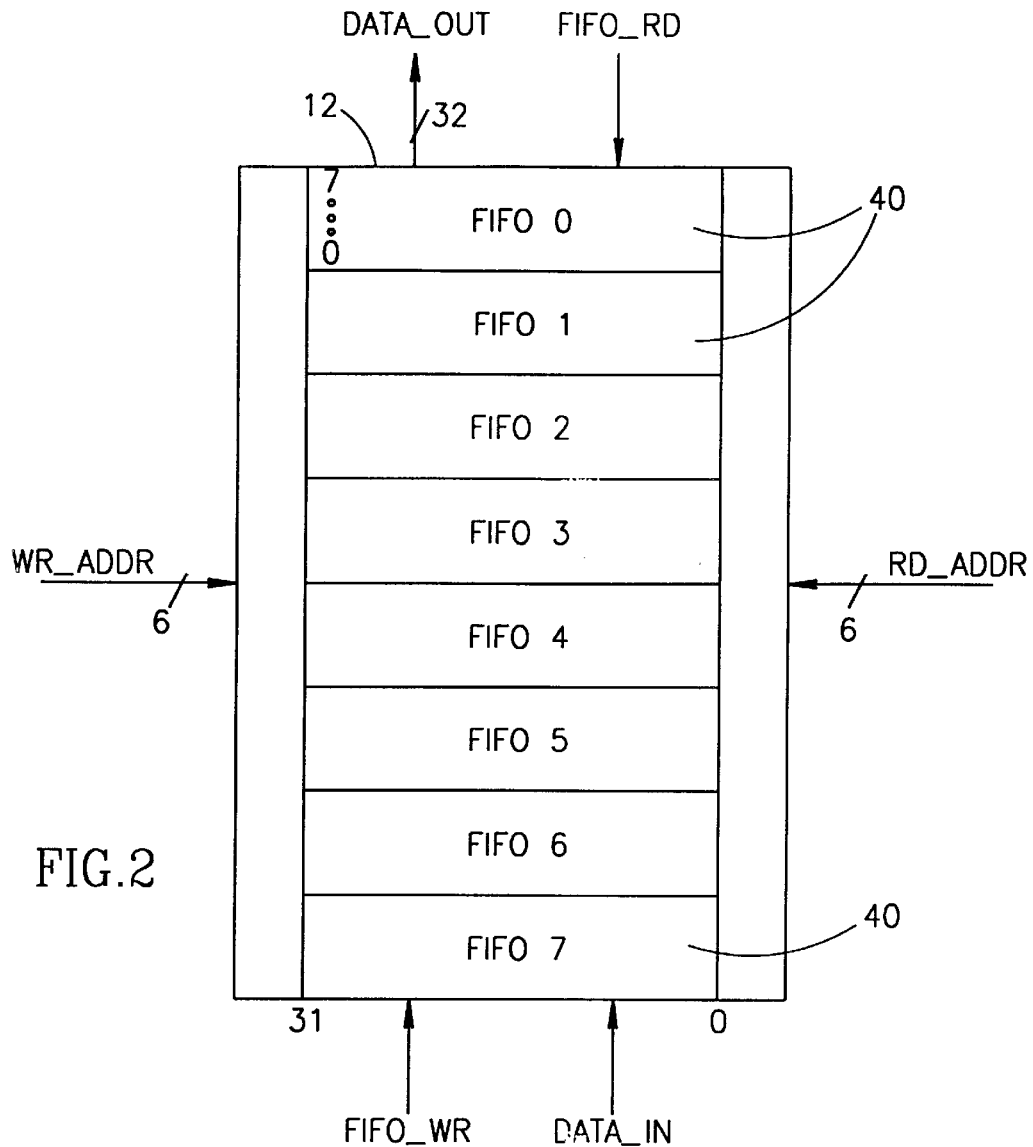
FIG. 2 is a detailed block diagram of the multiple FIFO memory portion of the present invention.

A detailed block diagram of memory 12 is illustrated in FIG. 2. In the example disclosed, memory 12 is partitioned into eight sections 40 labeled FIFO0 to FIFO7. Each FIFO is eight bits deep and each word is 32 bits wide. Thus, memory 12 is 64 words by 32 bits per word. As previously mentioned, a FIFO array of other sizes can easily be constructed using the principles disclosed herein. To address one in 64 words, a 6 bit address is required. A 6 bit address, WR_ADDR, supplies the write address and a 6 bit address, RD_ADDR, supplies the read address to memory 12. The 32 bit DATA_IN bus supplies the data to write into memory 12 and 32 bit DATA_OUT bus reads data out of memory 12. Also illustrated are two strobes FIFO_WR and FIFO_RD, the write and read strobes to memory 12, respectively.

Referring to FIGS. 1 and 2, as is known in the art, a conventional FIFO maintains separate read and write pointers into the FIFO memory array. In order to implement a multiple FIFO array in memory 12, separate read and write pointers must be maintained. Write pointers are maintained in write pointer registers 18. A separate write pointer is needed for each FIFO in the array. Thus, eight write pointer registers 18, WR0 to WR7, are needed for all eight FIFOs in the array. Each write pointer register 18 is 3 bits wide and comprises the lower 3 bits of the 6 bit WR_ADDR. The output of each write pointer register 18 is input to a multiplexer (MUX) 14. Multiplexer 14 is an eight to one MUX able to couple any one of its eight inputs to its output. The 3 bit select signal, WR_SEL, is provided by arbitration circuitry 22. The 3 bit WR_SEL also comprises the upper 3 bits of WR_ADDR.

The request to write a word into one of the FIFOs is input to arbitration circuitry 22 on the signal FIFO_WR_REQ. FIFO_WR_REQ comprises 8 bits, one bit for each of 8 FIFOs. Each request signal line corresponds to one of eight registers 26, labeled REG0 to REG 7. Registers 26 holds the data words to be written into each FIFO. Once a request is issued on one of the FIFO_WR_REQ lines, arbitration circuitry 22 outputs one of eight FIFO_WR_OE output enable signals. One FIFO_WR_OE output enable signal is coupled to each of eight registers 26. To write a 32 bit word into memory 12, arbitration circuitry 22 generates the appropriate FIFO_WR_OE signal and generates a write strobe on FIFO_WR. The data from the particular register 26 is input on the DATA_IN bus lines into memory 12. As discussed previously, the 3 bit write pointer address from write pointer registers 18 form the lower 3 bits of WR_ADDR and the 3 bit WR_SEL form the upper 3 bits of WR_ADDR. After each write operation, the corresponding write pointer register 18 is incremented by one by arbitration circuitry 22. Eight increment lines, INC_WR0 to INC_WR7, one for each write pointer register 18 are output from arbitration circuitry 22. Arbitration circuitry 22 also functions to prevent the write pointer registers from being incremented past their limit and overrunning the corresponding FIFO read pointer (i.e. overtaking the read pointer).

The read portion of multiple FIFO array 10 will now be discussed. Similar to the write portion of array 10, the read portion comprises eight read pointer registers 20, labeled RD0 to RD7, coupled to an eight to one multiplexer 16. The 3 bit select RD_SEL steers the 3 bit output of one of the eight read pointer registers 20 into the lower 3 bits of the read address input of memory 12. The upper 3 bits of the read address are provided directly by the 3 bit RD_SEL lines. To read a word out of one of the eight FIFOs, the RD_SEL lines are set to correspond to the appropriate read pointer register 20. Each read pointer register 20 corresponds to one of the eight FIFOs in memory 12. A read strobe, FIFO_RD, input to memory 12, causes a 32 bit word to be read out onto the 32 bit wide DATA_OUT bus lines. After each read operation, the corresponding read pointer register 20 is incremented by one by decode circuitry 24.

Decode circuitry receives the RD_SEL lines and FIFO_RD strobe signal and accordingly generates the eight increment signals, labeled INC_RD0 to INC_RD7.

Figure 3:
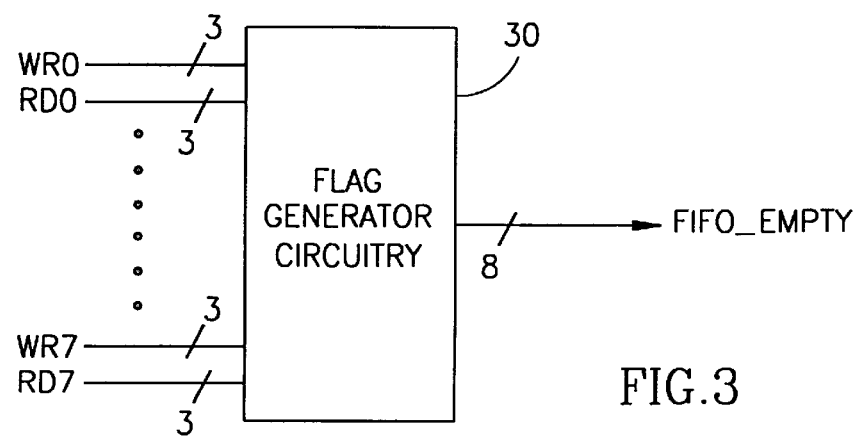
FIG. 3 is a schematic diagram of the flag generating circuitry portion of the present invention.

Many applications utilizing FIFOs require knowledge of when the FIFO is empty. Illustrated in FIG. 3 is a flag generator circuit 30 that outputs an empty flag for each FIFO. Input to flag generator circuitry 30 are the 3 bit values in write pointer registers 18 and read pointer registers 20. To determine whether a FIFO is empty or not, the write pointer register is compared to the read pointer register. If the write and read pointers are equal then the FIFO is empty. Thus, flag generator circuitry 30 compares the write and read pointer values for each of the eight FIFOs and generates and outputs eight corresponding empty signals, labeled FIFO_EMPTY.

In an alternative embodiment, not shown in the figures, the write and read pointer registers hold the entire 6 bit address of memory 12 rather than only a portion of the address. In this embodiment, each of the write and read pointer registers would only cycle through the portion of memory 12 corresponding to a particular FIFO. Following the example of FIG. 1, the write pointer register corresponding to FIFO0 would cycle through addresses 0 to 7. Write pointer register corresponding to FIFO1 would cycle through addresses 8 to 15. Write pointer register corresponding to FIFO7 would cycle through addresses 56 to 63. Operation of the read pointer registers follows in a similar fashion.

While the invention has been described with respect to a limited number of embodiments, it will be appreciated that many variations, modifications and other applications of the invention may be made.

We claim:

1. A multiple FIFO array comprising:
   a. a memory partitioned into a plurality of N sections, each said section corresponding to one of N FIFOs, said memory having a write address input, write strobe input, data input, read address input, read strobe and data output;
   b. a plurality of N write pointer registers, each write pointer register corresponding to one of said N FIFOs, each said write pointer register holding the write address corresponding to one of said N FIFOs;
   c. a write multiplexer having N write inputs, a write output and a write select input, said N write inputs coupled to the output of said plurality of N write pointer registers, said write output coupled to said write address input in said memory, said write select input for coupling one of said N write inputs to said write output;
   d. a plurality of N read registers, each read pointer register corresponding to one of said N FIFOs, each said read pointer register holding the read address corresponding to one of said N FIFOs; and
   e. a read multiplexer having N read inputs, a read output and a read select input, said N read inputs coupled to the output of said plurality of N read pointer registers, said read output coupled to said read address input in said memory, said read select input for coupling one of said N read inputs to said read output.

2. The array according to claim 1, further comprising a plurality of N registers holding data corresponding to said N FIFOs, said data being written into said memory via said data input upon activation of said write strobe.

3. The array according to claim 1, wherein the number N is a positive integer.

4. The array according to claim 1, wherein said memory is 64 words deep and each of said words is 32 bits wide.

5. The array according to claim 1, wherein said number N is equal to 8.

6. A multiple FIFO array comprising:
   a. a memory partitioned into a plurality of N sections, each said section corresponding to one of N FIFOs, said memory having a write address input, write strobe input, data input, read address input, read strobe and data output;
   b. a plurality of N write pointer registers, each write pointer register corresponding to one of said N FIFOs, each said write pointer register holding the lower portion of the write address corresponding to one of said N FIFOs;
   c. a write multiplexer having N write inputs, a write output and a write select input, said N write inputs coupled to the output of said plurality of N write pointer registers, said write output coupled to said write address input in said memory, said write select input for coupling one of said N write inputs to said write output;
   d. a plurality of N read registers, each read pointer register corresponding to one of said N FIFOs, each said read pointer register holding the lower portion of the read address corresponding to one of said N FIFOs;
   e. a read multiplexer having N read inputs, a read output and a read select input, said N read inputs coupled to the output of said plurality of N read pointer registers, said read output coupled to said read address input in said memory, said read select input for coupling one of said N read inputs to said read output, said read select input provided by a read select signal, said read select signal forming the upper portion of said read address input; and
   f. arbitration circuitry coupled to said write select input and said write address input, said arbitration circuitry for receiving a write request signal and a write select signal, said write select signal for forming the upper portion of said write address input and said write select input.

7. The array according to claim 6, further comprising a plurality of N registers holding data corresponding to said N FIFOs, said data being written into said memory via said data input upon activation of said write strobe.

8. The array according to claim 6, wherein the number N is a positive integer.

9. The array according to claim 6, wherein said memory is 64 words deep and each of said words is 32 bits wide.

10. The array according to claim 6, wherein said number N is equal to 8.

11. A method of constructing a multiple FIFO array, comprising the steps of:
   a. partitioning a memory into a plurality of N sections, each said section corresponding to one of N FIFOs, said memory having a write address input, wrote strobe input, data input, read address input, read strobe and data output;
   b. providing a plurality of N write pointer registers, each write pointer register corresponding to one of said N FIFOs, each said write pointer register holding the write address corresponding to one of said N FIFOs;
   c. providing a write multiplexer having N write inputs, a write output and a write select input;
   d. coupling said N write inputs to the output of said plurality of N write pointer registers;
   e. coupling said write output to said write address input in said memory;
   f. coupling one of said N write inputs to said write output;
   g. providing a plurality of N read registers, each read pointer register corresponding to one of said N FIFOs, each said read pointer register holding the read address corresponding to one of said N FIFOs;
   h. providing a read multiplexer having N read inputs, a read output and a read select input;
   i. coupling said N read inputs to the output of said plurality of N read pointer registers;
   j. coupling said read output to said read address input in said memory; and
   k. coupling one of said N read inputs to said read output.

12. The method according to claim 11, further comprising the steps of:
   a. providing a plurality of N registers holding data corresponding to said N FIFOs; and
   b. writing said data into said memory via said data input upon activation of said write strobe.

13. The method according to claim 11, wherein the number N is a positive integer.

* * * * *